J. K. STEWART.
RAILWAY ODOMETER.
APPLICATION FILED AUG. 16, 1913.
1,114,410.
Patented Oct. 20, 1914.
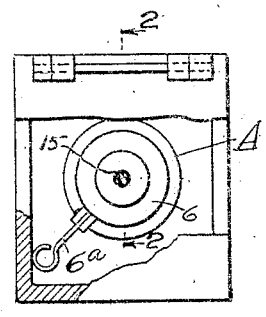
Fig. 1
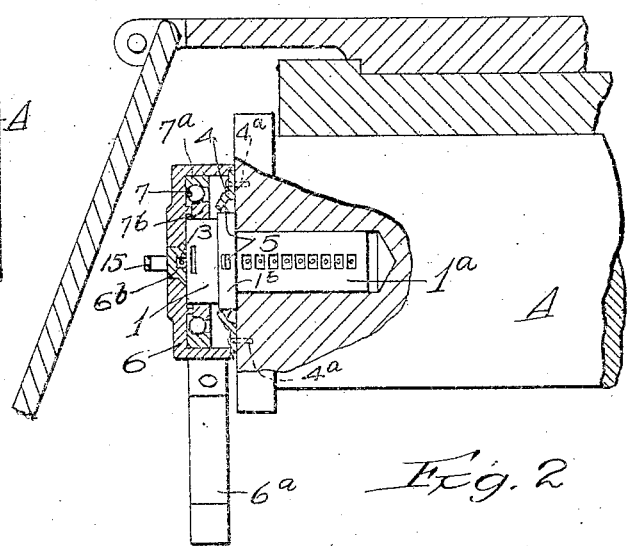
Fig. 2
Fig. 3
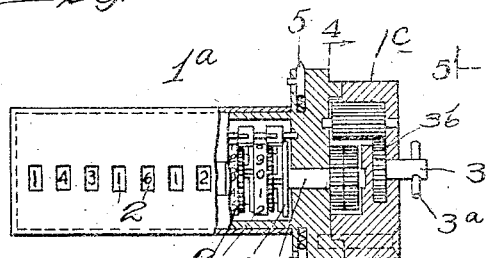
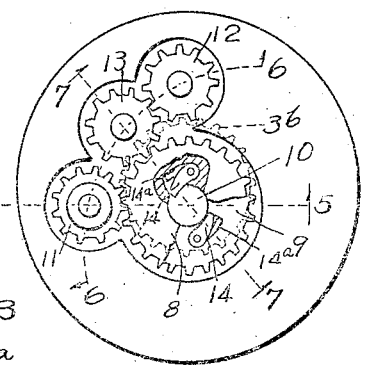
Fig. 4
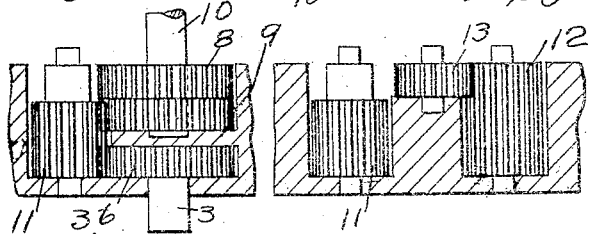
Fig. 5     Fig. 6     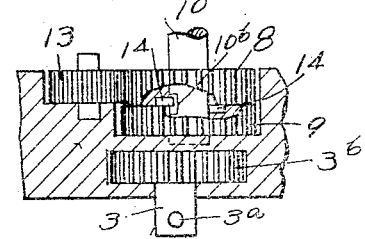 Fig. 7
Witnesses:
Inventor:
John K. Stewart
by Burton & Burton
his Attys.

UNITED STATES PATENT OFFICE.

JOHN K. STEWART, OF CHICAGO, ILLINOIS, ASSIGNOR TO STEWART-WARNER SPEEDOMETER CORPORATION, OF CHICAGO, ILLINOIS, A CORPORATION OF VIRGINIA.

RAILWAY-ODOMETER.

1,114,410.

Specification of Letters Patent.

Patented Oct. 20, 1914.

Application filed August 16, 1913. Serial No. 785,058.

*To all whom it may concern:*

Be it known that I, JOHN K. STEWART, a citizen of the United States, residing at Chicago, in the county of Cook and State of Illinois, have invented new and useful Improvements in Railway-Odometers, of which the following is a specification, reference being had to the accompanying drawings, forming a part thereof.

The purpose of this invention is to provide a revolution counter and actuating means therefor adapted to be carried on the end of a car axle within the usual axle box.

It consists of the features and elements described and shown in the drawings as indicated by the claims.

In the drawings:—Figure 1 is an interior view of a car axle box showing a side elevation of the device which is the subject of this invention. Fig. 2 is a sectional view taken as indicated at line 2—2 on Fig. 1. Fig. 3 is a detail view partly in section showing only the counter train and its accompanying gearing within its carrying frame. Fig. 4 is an enlarged detail section taken as indicated at line 4—4 on Fig. 3. Fig. 5 is a detail section taken as indicated at line 5—5 on Fig. 4. Fig. 6 is a developed sectional view taken as indicated at line 6—6 on Fig. 4. Fig. 7 is a detail section taken as indicated at line 7—7 on Fig. 4.

The construction which is peculiar to this device is especially designed to protect the comparatively delicate mechanism of the counter train from any possible injury by reason of rough handling of the device in its position in the car axle box. For this reason the entire counter train with its accompanying gearing is compactly carried in a frame or casing, 1, the dial wheels, 2, being co-axially alined and inclosed within the smaller cylindrical portion, $1^a$, of the frame which is designed to be inserted into a recess or socket bored in the end of the car axle, A. A conical flanged ring, 4, is fixed permanently to the end of the axle by means of screws, $4^a$, passing through its flange, thus leaving its conical portion spaced away from the end of the axle, and the flange, $1^b$, of the frame, 1, is provided with spring protruded dogs, 5, which extend for frictional contact with the under side of the conical ring, 4. The opening in the ring, 4, is just sufficient to admit the flange, $1^b$, of the frame; and to permit insertion of the latter the spring dogs, 5, are beveled so as to be forced back into their pockets in the flange, $1^b$, when the frame, 1, is pressed firmly in position; upon its arriving in position the dogs, 5, are again protruded by their springs for frictionally gripping the ring, 4, to stop the frame against rotation in the car axle, that is, to cause it to rotate bodily with said axle.

The counter mechanism is completely inclosed by the casing, 1, with the exception of a short portion of the initial shaft, 3, which projects from the outer or exposed end of the frame, 1, when the latter is inserted in position in the car axle as shown in Fig. 2. A heavy cap, 6, is rotatably mounted upon the exposed portion, $1^c$, of the frame, 1, preferably by means of ball-bearings, 7, as indicated, with the outer ball race, $7^a$, fixed in the cap and the inner race, $7^b$, made tight on the portion, $1^c$, of the frame. This cap, 6, is designed to be held against rotation within the car axle box by means of a radially extending tail, $6^a$, which may engage a wall of the box, as indicated in Fig. 1. Operative connection between this rotatably mounted cap, 6, and the mechanism of the counter train housed in the frame, 1, is provided in the form of a slot, $6^a$, positioned to engage a cross pin, $3^a$, in the extending end of the initial shaft, 3. Preferably, the portion, $1^c$, of the frame is cylindrical and the shaft, 3, is axially disposed within it, while the cap, 6, is mounted upon this portion of the frame so as to rotate about the axis of the shaft, 3, and the connecting slot, $6^a$, is positioned to pass through said axis of rotation so that the rotation of the frame, 1, with respect to the cap, 6, is communicated to the counter train in the simplest possible manner.

The construction of the cap and its ball-bearing mountings is sufficiently heavy to withstand hard usage, but even if this portion of the device should become strained or distorted such strain would not be communicated to the counter train through the comparatively loose connection of said train with the cap at the slot, $6^a$. For this particular use the counter train need not be geared to register miles of travel but will serve its purpose sufficiently if it indicates the number of individual rotations of the car axle. It is important, however, that gearing be provided to cause the counter train itself to revolve always in the same direction regardless of the rotation of the car axle, so as to prevent the travel of the car in one direction from being subtracted from the record of travel in the opposite direction. For this purpose there is provided the gearing shown in detail in Figs. 3 to 7, inclusive. This gearing comprises an initial or driving gear, $3^b$, fixed to the shaft, 3, and two driven gears, 8 and 9, loosely mounted on the shaft, 10, of the first wheel, $10^a$, of the counter train proper. The driven gear, 9, is connected with the driving gear, $3^b$, through a single idler pinion, 11, while the driven gear, 8, is connected to the said driving gear, $3^b$, through a series of two idler pinions, 12 and 13; thus the two driven gears, 8 and 9, are simultaneously revolved in opposite directions. Each of said gears, 8 and 9, carries a ratchet dog, 14, adapted to engage a notch, $10^b$, in the shaft, 10, whereby the shaft, 10, is adapted to be driven in one direction only, and only by one of the two gears at a time. Thus, if when the initial shaft, 3, is rotated in one direction the shaft, 10, is driven by the gear, 8, the gear, 9, will revolve idly in the reverse direction, but upon reversal of the direction of rotation of the initial shaft. 3, the direction of rotation of the gear, 8, will be reversed rendering this gear inoperative upon the shaft, 10, but the simultaneous reversal of the direction of rotation of the gear, 9, will bring its driving dog, 14, into engagement with the notch, $10^b$, of the shaft, 10, and the shaft, 10, will continue to rotate in its original direction, driven through the gear, 9. The ratchets, 14, are of flat stock and are merely laid in flat depressions or recesses in the faces of the respective gears, 8 and 9, so as to come flush with the general surface of the gears. A small knee spring, $14^a$, is inserted in each of the recesses back of the ratchet, and the entire assemblage becomes self-inclosed by the mounting of the gears, 8 and 9, with their ratchet-bearing faces proximate to each other, as indicated in Fig. 7.

As may be seen from Fig. 5, the idler, 11, while meshing with the driving gear, $3^b$, and with the driven gear, 9, stops short of the plane of the gear, 8, and thus avoids interference with the teeth of the latter. Since the shaft, 10, is eccentrically mounted in the frame, 1, it does not aline with the shaft, 3, and it becomes possible to choose a position for the long idler pinion, 12, at which it will mesh with the driving gear, $3^a$, but will avoid the teeth of both gears, 8 and 9, even though the latter gears be of the same size as the gear, $3^a$; motion is then communicated from this long pinion, 12, to the gear, 8, through the idler, 13, and the resulting opposite rotation of the two gears, 8 and 9, is obtained as above described.

As shown in Figs. 2 and 3, the spring dogs, 5, are beveled two ways, both to permit insertion of the device and to permit its withdrawal from the retaining ring, 4. Preferably, however, the springs by which these dogs are protruded are made quite stiff to insure sufficient frictional engagement of the dogs with the ring, 4, and, as a result, it will require considerable force to withdraw the device from the ring, 4. For this purpose, therefore, the center of the cap, 6, is provided with a lug or eye, 15, formed to be easily engaged by any suitable hooked tool to facilitate the removal of the device from the end of the axle.

I claim:—

1. A railway odometer comprising a frame, a counter train mounted therein, a cap rotatably connected with said frame, said cap and counter train having loosely coöperating features whereby the relative rotation of the cap and frame is communicated to said counter train, means for attaching the frame to the end of a car axle, and means for stopping the cap against rotation in the axle box.

2. A railway odometer comprising a frame, a counter train mounted therein, having an initial rotary element, a cap mounted on the frame for rotation about the axis of said initial element of the counter train, said cap and initial element having loosely coöperating features whereby the relative rotation of the cap on the frame is communicated to said counter train, means for securing the frame to the end of a car axle, and means for stopping the cap against rotation in the axle box.

3. A railway odometer comprising a counter train, a frame in which said train is mounted, means adapted to be fixed to the end of a car axle, and means on the said frame adapted to coöperate therewith for attaching the frame to said axle, a cap rotatably carried on the frame and dimensioned to cover completely the attaching means on the end of the axle, said cap and the counter train having loosely coöperating features whereby the relative rotation of the cap and frame is communicated to said counter train, and means for stopping the cap against rotation in the axle box.

4. A railway odometer comprising a frame, a counter train having a series of co-axially mounted dial wheels, said counter train being carried in the aforesaid frame and that portion of the frame which carries the said dial wheels being formed to occupy a socket in the end of a car axle, the remainder of said frame extending beyond the end of such car axle, a cap rotatably mounted on said extending portion of said frame, said cap and the counter train having loosely co-operating features whereby the relative rotation of the cap and frame is communicated to said counter train, means for securing the frame against rotation on the axle, and means for stopping the cap against rotation in the axle box.

5. In combination with a car axle, a railway odometer secured to one end thereof, comprising a counter train having an initial rotary element, a frame in which said train is mounted, said frame being fixed to the car axle with said initial element of the counter train axially positioned with respect to said axle, a cap in which the said frame is mounted for rotation about the axis of said initial element of the counter train, and means for stopping said cap against rotation in the car axle box.

In testimony whereof I have hereunto set my hand at Chicago, Illinois, this 13th day of August, 1913.

JOHN K. STEWART.

Witnesses:
O. O. SULLIVAN,
L. FEHLHABER.